US006420959B1

(12) United States Patent
Lizzi

(10) Patent No.: US 6,420,959 B1
(45) Date of Patent: Jul. 16, 2002

(54) MULTI-LEVEL USER INTERFACE FOR A MULTIMODE DEVICE

(75) Inventor: Ronald S. Lizzi, West Hartford, CT (US)

(73) Assignee: Timex Group B.V. (NL)

( * ) Notice: Subject to any disclaimer, the term of this patent is extended or adjusted under 35 U.S.C. 154(b) by 0 days.

(21) Appl. No.: 09/157,343

(22) Filed: Sep. 18, 1998

(51) Int. Cl.[7] .................................................. B60P 1/02

(52) U.S. Cl. ................................ 340/7.39; 340/825.56; 368/70; 368/82; 368/187; 368/261; 345/169

(58) Field of Search ....................... 340/825.44, 825.56, 340/7.39; 368/185, 49, 21, 11, 243, 250, 70, 82, 187, 261; 345/169

(56) References Cited

U.S. PATENT DOCUMENTS 4,786,902 A 11/1988 Davis et al. ........... 340/825.44
5,257,245 A * 10/1993 Thinesen ..................... 368/70
5,343,446 A * 8/1994 Simmons et al. ........... 368/251
5,555,226 A 9/1996 Lizzi ........................... 368/21
5,587,971 A * 12/1996 Thinesen ..................... 368/70
5,861,797 A * 1/1999 Becker .................... 340/309.3

* cited by examiner

*Primary Examiner*—Michael Horabik
*Assistant Examiner*—M Shimizu
(74) *Attorney, Agent, or Firm*—Carmody & Torrance LLP

(57) ABSTRACT

A multimode electronic device having a plurality of manually actuated buttons for selecting between a plurality of modes and functions wherein at least one of the modes has at least two second level functions. The device can cycle among the modes upon the repeated activation of a first button and can cycle among the functions upon the repeated activation of a second button. The multi-level hierarchy including both modes and functions provides for a more improved user interface with improved functionality.

6 Claims, 4 Drawing Sheets

MULTI-LEVEL USER INTERFACE FOR A MULTIMODE DEVICE

BACKGROUND OF THE INVENTION

The present invention relates generally to devices with multimode function capabilities, and in particular, to an improved device that provides multi-level mode functionality for facilitating mode and function access and operation of the device.

Devices such as watches, pagers, and/or pager/watches that are capable of displaying several modes such as a time-of-day mode, a chronograph mode, an alarm mode, and a pager mode are well known in the art. One example of a watch with multimode capability is described in U.S. Pat. No. 5,555,226 (the "'226 Patent"), assigned to the present assignee, and incorporated by reference as if fully set forth herein. While the '226 Patent is particularly directed to an improved method of setting an alternate time zone, the '226 Patent describes, in more than adequate detail, the capabilities of multimode electronic timepieces.

Pager/watch technology has also become very popular in recent years. One such example of a pager/watch with multimode capability is described in U.S. Pat. No. 4,786,902, which is also incorporated by reference as if fully set forth herein. Such a pager/watch device provides both paging capabilities and known multimode timepiece capabilities.

Heretofore, multimode access was primarily achieved by the actuation of a designated manual button, sometimes termed the "mode" button. Activation of the "mode" button permitted a user to move about (or cycle through) a plurality of modes such as the Time-of-Day (TOD) mode, Chronograph (CHRONO) mode,and Alarm (ALARM) mode. Copending application Ser. No. 09/157,342, now "abandoned" entitled "Device with Multimode Functions Including Display of Device Specific Information," (A0363) incorporated by reference as if fully set forth herein, even discloses a Pager (PAGER) mode.

However, with the desirability of additional functionality, the inventor herein has found that there is always an ongoing need for additional modes, or at the least, the need for a user interface methodology that provides a user with the needed structured access to a variety of device functions. Modification of known devices merely to add additional modes is less than desirable since it would only lead to confusion, since the existing buttons would need to take on a multitude of functions, possibly even one for each mode. Likewise, a device with an abundance of buttons to solve the aforementioned problem would be less than desirable since it would increase the likelihood that a user would become frustrated therewith.

Accordingly, a device that provides for an improved multimode capability by utilizing a multi-level user interface is desired. The invention disclosed herein achieves the aforementioned and below mentioned objectives.

SUMMARY OF THE INVENTION

Generally speaking, in accordance with the present invention, a multimode electronic device is provided. The device preferably includes a plurality of manually actuated buttons for selecting between a plurality of modes and functions, an integrated circuit programmed to provide the plurality of modes and functions and to provide an operator with the ability to enter and exit the plurality of modes and functions in response to actuation of selected ones of the buttons. In particular, the device includes a multi-level mode configuration, wherein the device has at least two first level modes and one of the modes has two second level functions. The device can enter each of the two first level modes by activation of a first button. The device is configured to enter each of the two second level functions by activation of a second button, wherein repeated activation of the second button cycles through each of the two second level functions. Further activation of the second button when the device is in the last (or second, in this example) of the two second level functions causes the device to reenter the mode having the second level functions. That is, repeated activation of the first button causes the device to cycle between and among the first level modes and repeated activation of the second button causes the device to cycle between a first level mode and between and among its second level functions.

Accordingly, it is an object of the present invention to provide a multimode device that can provide additional mode capability.

Another object of the present invention is to provide a multimode device that can provide additional functionality.

Another object of the present invention is to provide a device having an improved multi-level user interface.

Another object of the present invention is to provide a device having multi-level mode capabilities that is easy for a user to access.

Another object of the present invention is having multi-level functionality that is easy for a user to access.

Another object of the present invention is to provide such multi-level interfacing with easy learnable sequencing operations.

Still other objects and advantages of the invention will in part be obvious and will in part be apparent from the specification.

The invention accordingly comprises the features of construction, combination of elements and arrangement of parts which will be exemplified in the construction hereinafter set forth, and the scope of the invention will be indicated in the claims.

BRIEF DESCRIPTION OF THE DRAWINGS

For a fuller understanding of the invention, reference is made to the following description taken in connection with the accompanying drawings, in which.

DETAILED DESCRIPTION OF THE PREFERRED EMBODIMENTS

Figure 1:
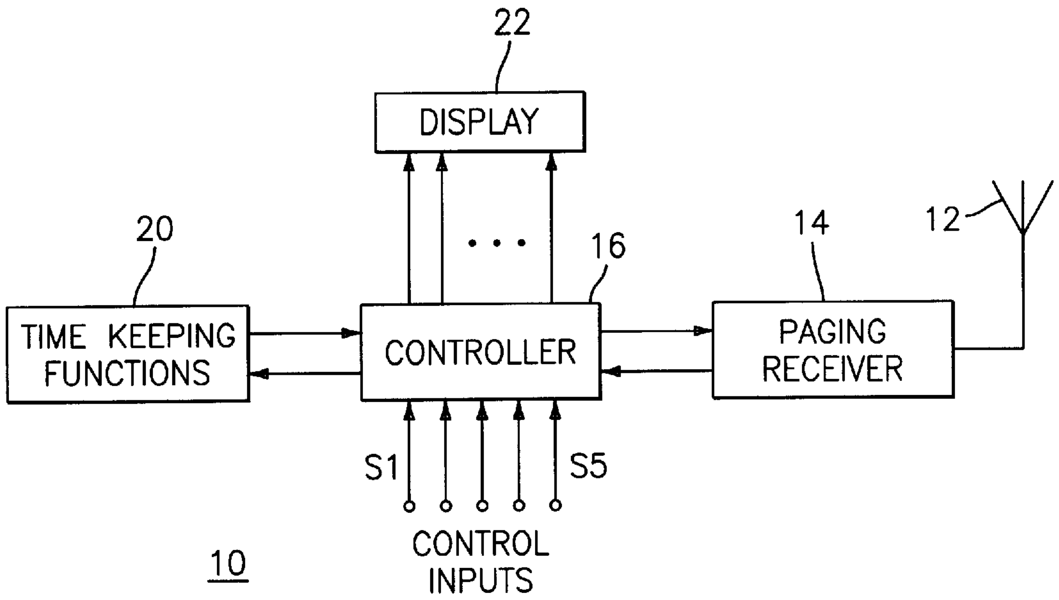
FIG. 1 is a simplified functional block diagram of a device constructed in accordance with the present invention.

Reference is first directed to FIG. 1, which represents a simplified functional block diagram for a multimode electronic device 10. Device 10 may be a timepiece, such as a watch, a pager, or, as illustrated in FIG. 1, a combination pager/watch.

In an embodiment wherein device 10 is a combination pager/watch, an electronic watch circuit 20 coupled to controller 16 provides time information such as time and day and date. The information is displayable on a display 22. An antenna 12 is coupled to a paging receiver 14, which itself is coupled to controller 16. Paging receiver 14 receives transmitted coded message signals and displays the received message information on display 22. The time information being generated by watch circuit 20 may include other functions such as elapsed time, interval times, and an alarm. Control of watch circuit 20 and paging receiver 14 is provided by user control inputs S1–S5, which are coupled to controller 16, and which may be coupled to the push buttons illustrated in FIG. 3.

In normal operation, the pager/watch arrangement of FIG. 1 may function like a watch with the present time displayed on display 22. The control inputs provide control of the watch functions through controller 16. However, when transmitted coded message signals, or pages, are received and decoded by paging receiver 14 in a manner well known to one skilled in the art, a control signal is generated by paging receiver 14 causing the pager/watch arrangement to function as a display pager. Such an understanding is clearly discernible from the aforementioned U.S. Patent No. 4,786,902.

Figure 2:
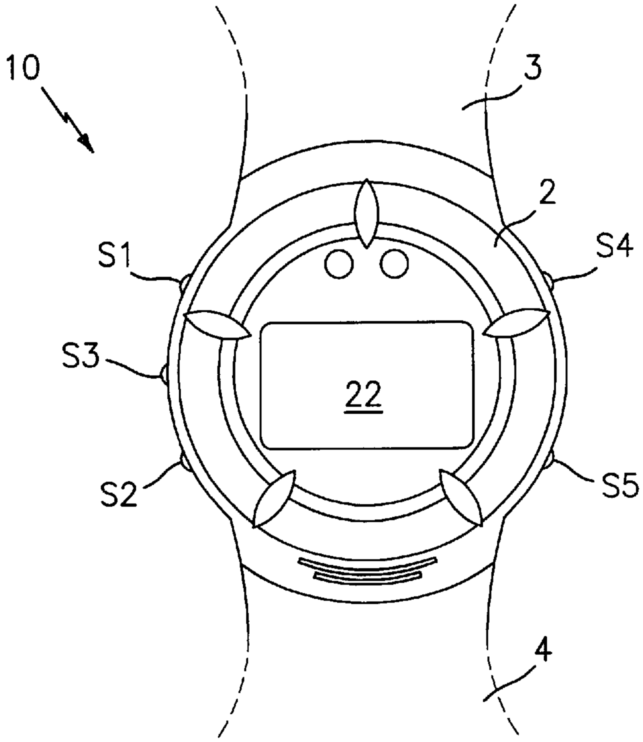
FIG. 2 is a plan view of an exemplary device constructed in accordance with the present invention.

Reference is now made to FIG. 2 which illustrates exemplary device 10 and which should be understood to represent a watch, pager or combination pager/watch. Device 10 may include a case 2 adapted to be held on the wrist by a strap, portions of which may be seen at 3 and 4. Alternatively, device 10 may be designed to be handheld or mountable on a belt or the like. The case 2 includes the aforementioned manual push button actuators S1, S2, S3, S4 and S5, arranged to close spring contacts (not shown) inside the case 2. Electro-optic display 22, which is commonly a liquid crystal display (LCD), exhibits digits, letters or other symbols as appropriate when activated by a microcomputer inside device 10. The microcomputer is manifested in the form of an integrated circuit.

Figure 3:
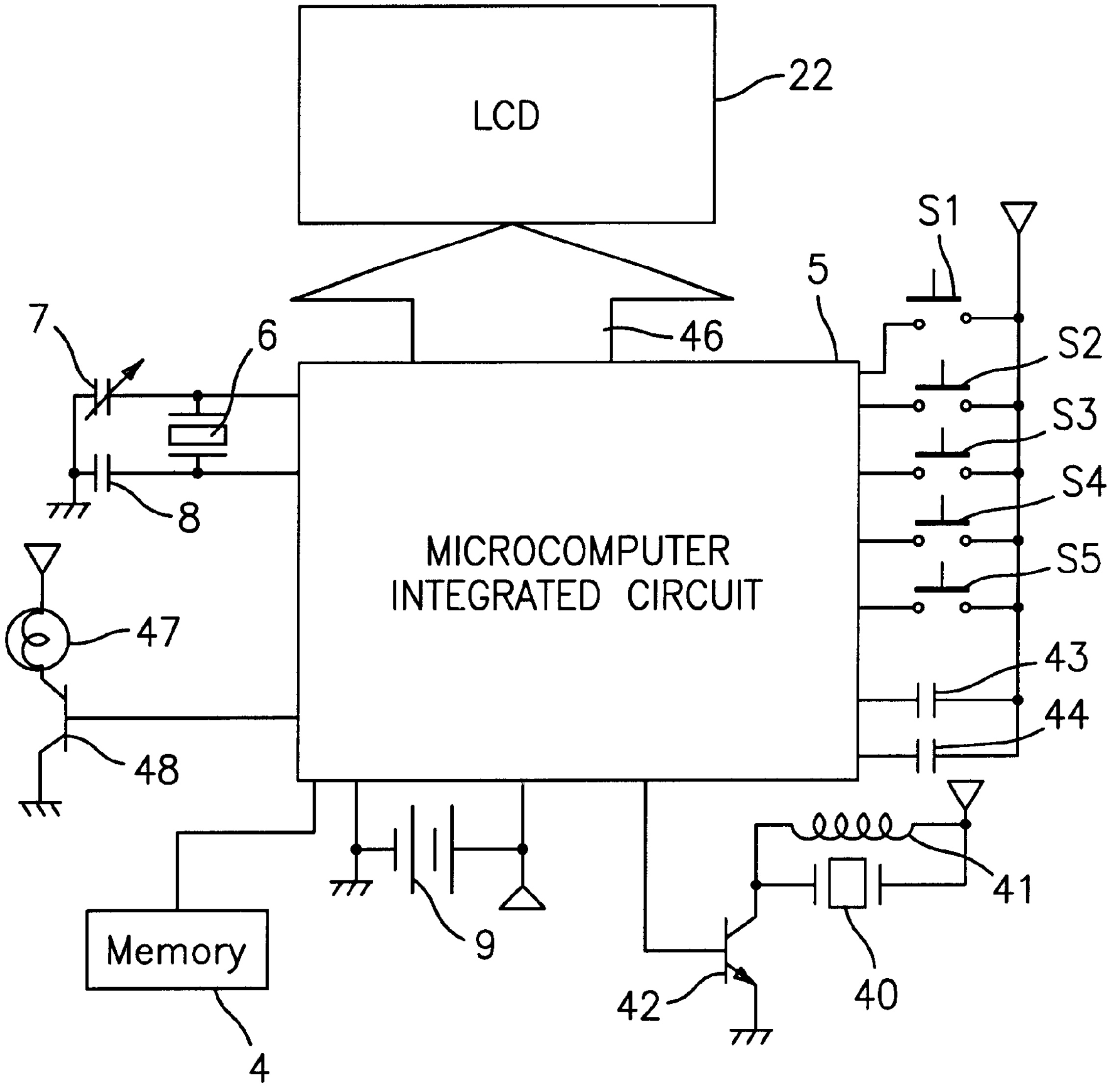
FIG. 3 is a block diagram of a circuit that controls the multimode functions in accordance with the present invention illustrating exemplary external components such as a lamp, switches and a display.

FIG. 3 is a schematic block diagram of the electrical connections constructed in accordance with the present invention. A programmable microcomputer 5, in the form of a mask-programmable integrated circuit, is bonded to a printed circuit board (not shown), and includes suitable pin connections and leads connected to various external components shown in the diagram which are also mounted on the printed circuit board. The microcomputer 5 also includes a microprocessor, an operating system program for carrying out instructions, and memory locations.

A quartz crystal 6 coupled to capacitors 7 and 8 and connected to the oscillator pins of the integrated circuit 5 provides a high-frequency time base. A battery power source 9 is provided in the form of a button type energy cell in case 2. An alarm may be provided and composed of a piezoelectric crystal 40, an inductance coil 41 and a drive transistor 42. Two fixed external capacitors 43 and 44, in conjunction with other circuit elements combined inside the integrated circuit 5, serve to boost the output voltage to drive LCD 22 via a display bus 46, which represents several parallel leads connected to the various actuable segments of LCD 22. LCD 22 is positioned in proximity to a lamp 47 so that when lamp 47 is lit by a switching signal from the integrated circuit 5 applied to the base of a switching transistor 48, LCD 22 will become illuminated.

In order to appreciate the present invention, reference must briefly be made to the aforementioned U.S. Pat. No. 5,555,226 which illustrates a diagram of multimode functions and describes in connection therewith, the sequencing of modes or states in response to actuation of switches S1–S4.

That is, in FIG. 3 of the '226 patent, the blocks above the table illustrate the appearance of the display 22 at start-up for the modes shown. Beneath each of the display blocks is a column illustrating what happens when the respective switches S1–S4 are actuated while in that mode. The modes in the '226 Patent are Time of Day (TOD), Chronograph (CHRONO), Timer (TIMER) and Time of Day II (T2). As indicated in the row S3, the program is arranged to shift modes sequentially in a continuous loop.

Once in the TOD, CHRONO, TIMER or T2 mode, actuation of switch S4 causes execution of a subroutine SET for changing the information displayed in that mode. Switch S3 may SELECT a particular piece of information which is indicated on the display by "flashing" the indicia for that piece of information, and switch S1 may ADVANCE the value of that piece of information. Depressing S4 again would preferably allow exiting from the particular mode. Depressing S2 activates a lamp.

Accordingly, and broadly speaking, the '226 Patent is limited, by virtue of its button sequencing and user interface, in the ability to provide a multi-level hierarchy. That is, it should now be understood that once in the TOD mode, depression of S4 places device 10 in the SET mode. However, depression of button S4 again merely exits SET mode and returns the device to the TOD display. There are no other submodes that are enterable or functionality that is accessible from the TOD mode. At best, if the SET mode in each of the TOD, CHRONO, TIMER or T2 modes is thought of as a submode or a function of the higher level mode, it is clear that each of the modes in the '226 Patent has at most one (1) submode or function associated therewith.

Figure 4:
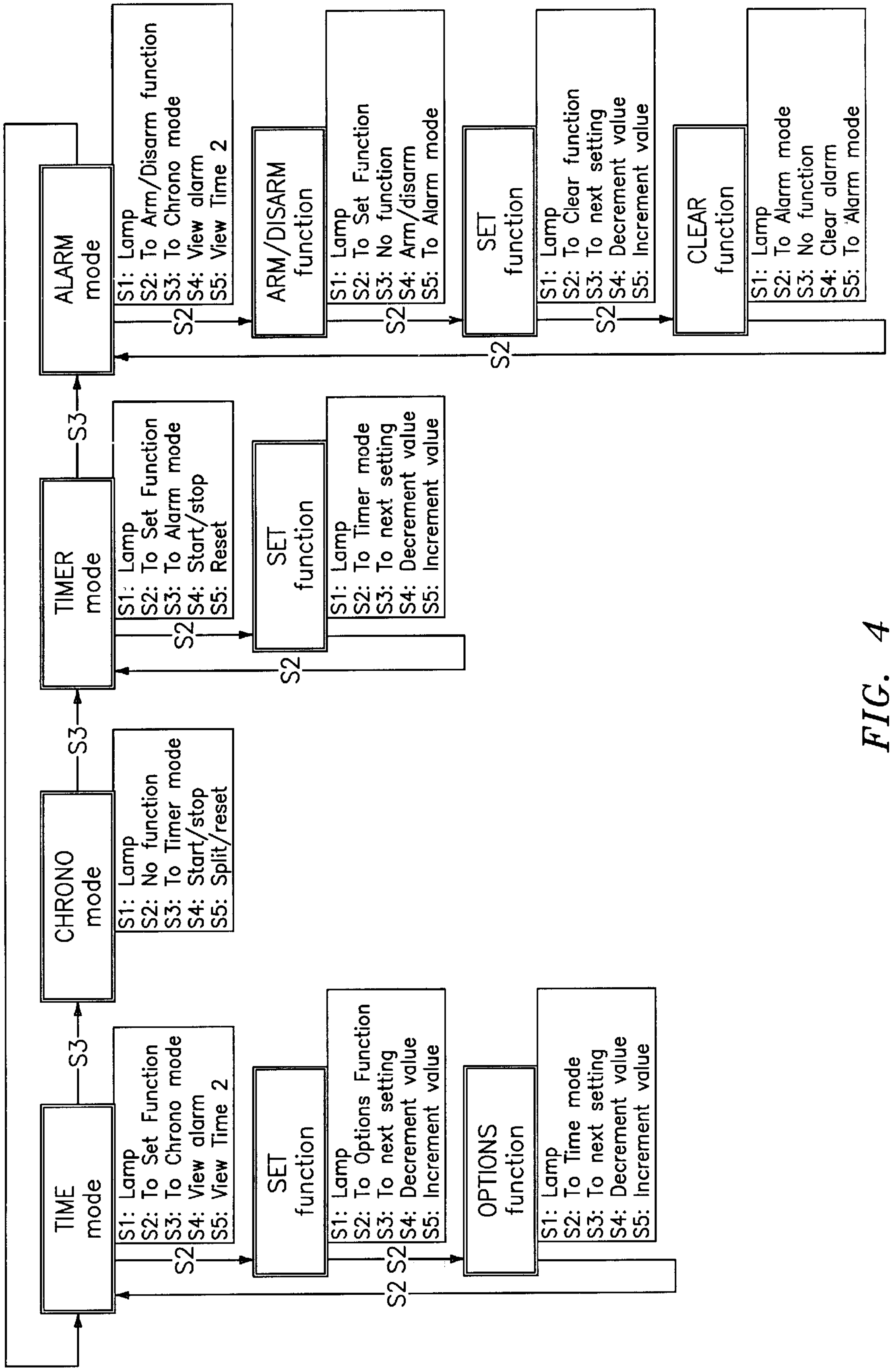
FIG. 4 is a simplified diagram illustrating mode and function sequencing in response to manually actuated buttons in accordance with the present invention.

Reference is now made to FIG. 4 which, in combination with the following disclosure, more particularly discloses an improved multi-level user interface for a multimode electronic device in accordance with the present invention.

That is, in accordance with the present invention, device 10 may also preferably include a plurality of modes, such as the aforementioned TIME (i.e. TOD), CHRONO, TIMER and ALARM. These modes, as defined herein, may be thought of as first level modes. Similar to the known multimode user interface protocol, repeated activation of actuatable button S3 would cause the sequencing between and among the plurality of first level modes.

However, in accordance with the present invention, one of the plurality of actuatable buttons (in the preferred embodiment, S2) permits the sequencing through of a plurality of submodes within each first level mode, defined herein as second level functions. That is, and referring to FIG. 4 and the TIME mode for example, activation of S2 from the first level TIME mode places device 10 in the first of the second level functions, and in particular, the SET function. This first second level function is similar to the SET function of FIG. 3 in the '226 Patent, wherein depression of S4 in the '226 Patent causes the device to enter the SET Mode.

However, the present invention is distinguished from the '226 patent in that, as can be seen in FIG. 4 herein, subsequent activation of S2 does not return the device to the first level TIME mode, but rather, causes device 10 to sequence to a further second level function, in the preferred embodiment, an OPTIONS Function, where a user could do such things as set the scrolling speed for pager message displays.

It is only after each of the second level functions have been sequenced by S2 does device 10 once again enter the TIME first level mode.

Turning now to the ALARM mode for a second example of the present invention, it can be seen that repeated activation of S2 from the first level ALARM mode causes the cycling through of a plurality of functions such as an ARM/DISARM function, a SET function and a CLEAR function. This is patentably distinguishable from the '226 patent wherein the depression of the same button (i.e., S4) would immediately cause entry of the SET mode and the exit thereof.

Figure 5:
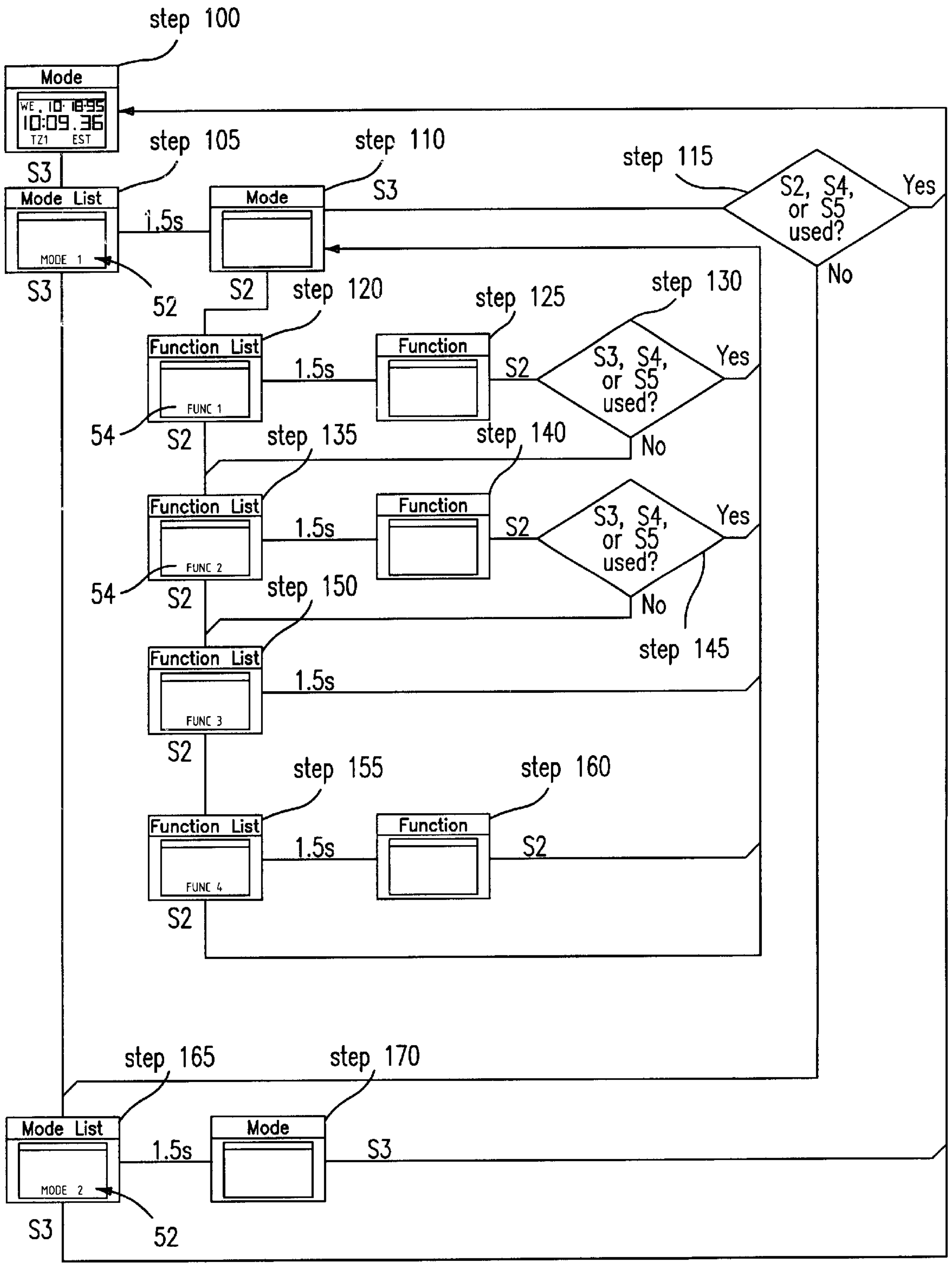
FIG. 5 is a further detailed diagram illustrating the present invention and in particular, an exemplary sequencing through and display of the multi-level mode hierarchy and features incorporated therein.

Reference will now be made to FIG. 5, which, when taken in connection with the following, more particularly sets forth other advantageous aspects of the present invention.

In the example illustrated, each actuation of S3 selects the next mode in a Mode List. For example, it may be assumed that device 10 is originally in the TIME mode (herein designated MODE 0 and indicated as step 100). The next mode accessible in the Mode List by depression of S3 and displayable on display 22 is MODE 1 (step 105). It should be understood that each mode such as MODE 1 and MODE 2, are considered the first level modes. In the preferred embodiment, MODE 1 may be identified by an identifier 52. Without further actuation of S3, identifier S2 is displayed on display 22 for preferably one-and-a-half (1.5) seconds. Thereafter, device 10 enters MODE 1 (step 110). The utilization of the 1.5 second delay permits a user to identify the particular first level mode for which entry may be desired.

Once in MODE 1, if button S2 is activated, device 10 exits the first level mode and proceeds with the display of the first function of a Function List (step 120). The functions in the Function List are the aforementioned second level functions. In a similar fashion as with the mode identifier, each second level function in the Function List may be identified by identifier 54. If the user does not delay in the repeated activation of S2, but rather continues to press S2, the device will cycle among and between the available second level functions in the Function List (step 135, 150, 155) and will, upon exhaustion of the second level functions in the Function List, return to the first level MODE 1 (step 110). If, after arriving at a particular function in the Function List the user does not immediate activate S2 for at least one-and-a-half (1.5) seconds, the device enters into the particular second level function (if such function permits further action therein). For example, FUNC 1, FUNC 2 and FUNC 4 each permit further action therein. Accordingly, if FUNC 1 is the function appearing on the Function List (step 120), a delay of 1.5 causes the device to enter FUNC 1 (step 125). In a similar manner, the device can enter FUNC 2 (step 140) and FUNC 4 (step 160). Since FUNC 3 is exemplified as having no available functionality and may be a pause function for a scrolling message if the first level mode is the pager mode for example, non-depression of S2 at step 150 for one-and-a-half (1.5) seconds causes the device to return to the first level mode, MODE 1 (step 110).

By way of example, since FUNC 4 (step 155) is the last available second level function for MODE 1, the device will automatically return to the first level MODE 1 regardless of whether the function was used.

That is, an additional and particularly advantageous feature of the present invention is the ability to return to the first level mode immediately after use of a particular second level function within the first level mode. For example, assume that the function indicated in step 125 is the SET Function within the ALARM mode of FIG. 4. While at step 125, there is activation of S4 (Decrement value) and/or S5 (increment value). Upon the subsequent activation of S2, the device will immediately advance to step 130 wherein there is a determination if there is a positive indication of the actual setting of the alarm. If there was, the device will return to the first level MODE 1 (herein ALARM mode). If there was initially a 1.5 second delay causing the entry into the second level function (step 125) but there was no subsequently activity within the function (the determination at step 130 is negative) a subsequent activation of S2 causes a return to the Function List (step 135). This advantageous feature assumes the user, upon the use of a particular second level function, will want to immediately return to the first level mode, and not desire to further sequence through the remaining available functions.

It should also be understood that the flowchart in FIG. 5 is exemplary of one particular subroutine available in the preferred embodiment. That is, it is also contemplated that additional buttons may also immediately return the user to the first level mode. Examples of this may be illustrated by analogy to FIG. 4 with respect to the ARM/DISARM and CLEAR Function. It can be seen that activation of S5 also immediately returns the device to the first level ALARM mode.

Returning briefly to FIG. 5, it can also be seen that such an "intelligent" user interface can be utilized with respect to the sequencing through the first level modes. For example, and consistent with the foregoing, upon the return of the device to the first level MODE 1 (step 110), any subsequent activation of S3 after activity within any of the second level functions of a first level mode has taken place (step 115) will automatically return the device to the default TIME MODE 0 (step 100). In this manner, the device is constructed to assume that after setting an alarm, arming/disarming the alarm, setting the timer, etc., the user will most likely desire to return to the TIME mode upon activation of S3 (see steps 115, 100). Such programming eliminates the user from undesirable repeated sequencing through the remaining first level modes in the Mode List.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

For example, it should be clear that additional or different second level functions may be provided within one or more of the first level modes. Similarly, the order in which the second level functions are displayed is a matter of design choice. Similarly, the particular button arrangements and functions thereof can be changed while still remaining within the scope of the invention, only keeping in mind the essence of the invention, and that is the ability to sequence about a plurality of first level modes with one button and the ability to sequence about a plurality of second level functions within a first level mode with a second button.

The present invention and the multi-level hierarchy as disclosed herein also facilitates the use of many additional advantageous features not available in prior art multimode watches. For example, providing a different function display for each function (i.e. ARM/DISARM, SET, CLEAR) facilitates providing on-display instructions at each function display. That is, at each new function display, text messages, or arrows, may "walk" a user through the particular feature and options associated therewith. In distinction thereto, the prior art devices required a user to memorize a plurality of (sometimes) very complicated button sequences to activate or set a function.

Additionally, it is contemplated hereby that the OPTIONS Function may contain particular information about the device, similar to the ABOUT mode disclosed in Applicant's copending application. Forward or reverse sequencing through the information displays can be provided by use of S4 or S5.

Lastly, the present invention can incorporate what Applicant has coined a "Dynamic Function List" wherein cycling between and among certain of the second level functions can be dependent on the settings therein. For example, in the ALARM mode, if the alarm had been previously cleared, there would be no reason for a user to subsequently scroll through the CLEAR function unless and until the alarm had been set again. This dynamic scrolling through of the functions can be accomplished with the setting of flags upon the occurrence of an activity, such as would occur by the depression of buttons in a certain sequence. Such a feature can save a user time by avoiding unnecessary scrolling through the functions.

It is also to be understood that the following claims are intended to cover all of the generic and specific features of the invention described herein and all statements of the scope of the invention which as a matter of language might fall therebetween.

I claim:

1. A multimode electronic device having a plurality of manually actuated buttons for selecting between a plurality of first level modes and second level functions, an integrated circuit programmed to provide the plurality of first level modes and second level functions and to provide an operator the ability to enter and exit the plurality of modes and functions in response to actuation of selected ones of the buttons, the device comprising:

means for being placed in at least a first first level mode and a second first level mode, wherein placement in and among the first first level mode and the second first level mode is achieved by activation of a first button, wherein at least one of the first level modes includes at least two second level functions;

means for being placed in each of the at least two second level functions, each of the at least two second level functions being enterable from the one of the first level modes by activation of a dedicated button, wherein an activation of the dedicated button causes the device to enter each of the second level functions, wherein the dedicated button is functionless within the second level functions, and wherein a further activation of the dedicated button causes the device to exit the respective second level function, wherein repeated activation of the dedicated button cycles through each of the at least two second level functions, and further activation of the dedicated button when the device is in the last of the at least two second level functions causes the device to reenter the one of the first level modes;

wherein (i) each of the second level functions are enterable and exitable only by activation of the dedicated button; (ii) the dedicated button is a button different from the first button; and (iii) the dedicated button is operable only within a first level mode and is thereby unable to cause the device to cycle among the first level modes and wherein each of the first level modes having at least one second level function has all of its second level functions enterable and exitable by activation of the dedicated button, and wherein activation of the dedicated button from within the last of the second level functions within each of the first level modes having at least one second level function will cause the return to the first level of the mode in which the device is in.

2. The device as claimed in claim 1, including display means for displaying the first level modes and the second level functions.

3. The device as claimed in claim 1, including dynamic function setting means for providing selective accessibility to the second level functions, said dynamic function setting means including flag means being settable or resettable in response to actuation of selected ones of the buttons.

4. A multimode electronic device comprising:

a plurality of manually actuated buttons for selecting between a plurality of first level modes and second level functions, and an integrated circuit programmed to provide the plurality of first level modes and second level functions and to provide an operator the ability to enter and exit the plurality of modes and functions in response to actuation of selected ones of the buttons;

wherein the device is placeable in at least a first first level mode and a second first level mode, wherein placement in and among the first level modes is achieved by activation of a first button, wherein at least one of the first level modes includes at least two second level functions; and wherein the device is placeable in each of the at least two second level functions, each of the at least two second level functions being enterable from the one of the first level modes by activation of a dedicated button, wherein an activation of the dedicated button causes the device to enter each of the second level functions, wherein the dedicated button is functionless within the second level functions, and wherein a further activation of the dedicated button causes the device to exit the respective second level function, wherein repeated activation of the dedicated button cycles through each of the at least two second level functions, and further activation of the dedicated button when the device is in the last of the at least two second level functions causes the device to reenter the one of the first level modes;

wherein (i) each of the second level functions are enterable and exitable only by activation of the dedicated button; (ii) the dedicated button is a button different from the first button; and (iii) the dedicated button is operable only within a first level mode and is thereby unable to cause the device to cycle among the first level modes; and wherein each mode of the first level modes having at least one second level function has all of its second level functions enterable and exitable by activation of the dedicated button, and wherein activation of the dedicated button from within the last of the second level functions within each mode of the first level modes having at least one second level function will cause the return to the first level of the mode in which the device is in.

5. A multimode electronic device having a plurality of manually actuated buttons for selecting between a plurality of first level modes and second level functions, an integrated circuit programmed to provide the plurality of first level modes and second level functions and to provide an operator the ability to enter and exit the plurality of modes and functions in response to actuation of selected ones of the buttons, the device comprising:

means for being placed in at least a first first level mode and a second first level mode, wherein placement in and among the first level modes is achieved by activation of a first button, wherein the first level mode and the at least second level mode each include at least two second level functions;

means for being respectively placed in each of the at least two second level functions from each of the first first level mode and the at least second first level mode;

wherein, within each of the first level modes having at least two second level functions:

each of the at least two second level functions are enterable from its respective first level mode by activation of a dedicated button, an activation of the dedicated button causes the device to enter each of the second level functions, the dedicated button is functionless within the second level functions, and a further activation of the dedicated button causes the device to exit the respective second level function, wherein repeated activation of the dedicated button cycles through each of the at least two second level functions, and further activation of the dedicated button when the device is in the last of the at least two second level functions causes the device to reenter the first level mode in which the device is in;

wherein (i) each of the second level functions are enterable and exitable only by activation of the dedicated button; (ii) the dedicated button is a button different from the first button; and (iii) the dedicated button is operable only within a first level mode and is thereby unable to cause the device to cycle among the first level modes.

6. A multimode electronic device comprising:

a plurality of manually actuated buttons for selecting between a plurality of first level modes and second level functions, and an integrated circuit programmed to provide the plurality of first level modes and second level functions and to provide an operator the ability to enter and exit the plurality of modes and functions in response to actuation of selected ones of the buttons;

wherein the device is placeable in at least a first first level mode and a second first level mode, wherein placement in and among the first level modes is achieved by activation of a first button, wherein at least the first level mode and the second level mode each include at least two second level functions;

wherein the device is respectively placeable in each of the at least two second level functions from each of the first first level mode and the at least second first level mode;

wherein, within each of the first level modes having at least two second level functions:

each of the at least two second level functions are enterable from its respective first level mode by activation of a dedicated button, an activation of the dedicated button causes the device to enter each of the second level functions, the dedicated button is functionless within the second level functions, and a further activation of the dedicated button causes the device to exit the respective second level function, wherein repeated activation of the dedicated button cycles through each of the at least two second level functions, and further activation of the dedicated button when the device is in the last of the at least two second level functions causes the device to reenter the first level mode in which the device is in;

wherein (i) each of the second level functions are enterable and exitable only by activation of the dedicated button; (ii) the dedicated button is a button different from the first button; and (iii) the dedicated button is operable only within a first level mode and is thereby unable to cause the device to cycle among the first level modes.

* * * * *